(12) United States Patent
Dawson et al.

(10) Patent No.: US 6,590,308 B2
(45) Date of Patent: Jul. 8, 2003

(54) HIGH POWER DENSITY SUPER-CONDUCTING ELECTRIC MACHINE

(75) Inventors: Richard Dawson, Schenectady, NY (US); Yu Wang, Clifton Park, NY (US); Evangelos Trifon Laskaris, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/854,944

(22) Filed: May 15, 2001

(65) Prior Publication Data

US 2002/0171322 A1 Nov. 21, 2002

(51) Int. Cl.[7] ........................ H02K 55/00; H02K 55/02; H02K 51/00
(52) U.S. Cl. ........................ 310/162; 310/163; 310/270; 310/52
(58) Field of Search ................. 310/163, 52, 162; H02K 55/00, 51/00, 55/02

(56) References Cited

U.S. PATENT DOCUMENTS

| 4,277,705 | A | * | 7/1981 | Rios ........................ 310/215 |
|---|---|---|---|---|
| 5,532,663 | A | | 7/1996 | Herd et al. |
| 5,548,168 | A | * | 8/1996 | Laskaris et al. .............. 310/10 |
| 5,672,921 | A | | 9/1997 | Herd et al. |
| 5,774,032 | A | | 6/1998 | Herd et al. |
| 5,777,420 | A | * | 7/1998 | Gamble et al. .............. 310/261 |
| 5,798,678 | A | | 8/1998 | Manlief et al. |
| 5,953,224 | A | | 9/1999 | Gold et al. |
| 6,066,906 | A | * | 5/2000 | Kalsi .......................... 310/112 |
| 6,140,719 | A | | 10/2000 | Kalsi |
| 6,169,353 | B1 | * | 1/2001 | Driscoll et al. ............. 310/261 |
| 6,173,577 | B1 | | 1/2001 | Gold |
| 2002/0125787 | A1 | | 9/2002 | Howard et al. .............. 310/254 |
| 2003/0011253 | A1 | | 1/2003 | Kalsi et al. .................. 310/58 |
| 2003/0011273 | A1 | | 1/2003 | Kalsi et al. .................. 310/261 |
| 2003/0011452 | A1 | | 1/2003 | Snitchler et al. ............. 335/216 |

FOREIGN PATENT DOCUMENTS

| JP | 58119764 | A | * | 7/1983 | .......... H02K/55/00 |
|---|---|---|---|---|---|
| JP | 58130769 | A | * | 8/1983 | .......... H02K/55/00 |
| JP | 06181168 | A | * | 6/1994 | .......... H01L/21/027 |

* cited by examiner

Primary Examiner—Nestor Ramirez
Assistant Examiner—J. Aguirrechea
(74) Attorney, Agent, or Firm—Nixon & Vanderhye P.C.

(57) ABSTRACT

A high power density synchronous machine is disclosed comprising: a stator having conventional stator coils arranged in an annulus around a vacuum cylindrical cavity; a magnetically saturated cylindrical magnetic solid rotor core; a race-track super-conducting coil winding extending around the rotor core, and a coil supportextending through the core and attaching to opposite long sides of the coil winding.

19 Claims, 3 Drawing Sheets

HIGH POWER DENSITY SUPER-CONDUCTING ELECTRIC MACHINE

RELATED APPLICATIONS

This application is related to the following commonly-owned and commonly-filed applications (the specifications and drawings of each are incorporated herein):

U.S. patent application Ser. No. 09/854,932 entitled "Superconducting Synchronous Machine Having Rotor And A Plurality Of Super-Conducting Field Coil Windings", filed May 15, 2001;

U.S. patent application Ser. No. 09/854,933 entitled "High Temperature Super-Conducting Rotor Coil Support With Split Coil Housing And Assembly Method", filed May 15, 2001;

U.S. patent application Ser. No. 09/854,931 entitled "Synchronous Machine Having Cryogenic Gas Transfer Coupling To Rotor With Super-Conducting Coils", filed May 15, 2001;

U.S. patent application Ser. No. 09/855,026 entitled "High Temperature Super-Conducting Synchronous Rotor Coil Support With Tension Rods And Method For Assembly Of Coil Support", filed May 15, 2001;

U.S. patent application Ser. No. 09/854,946 entitled "High Temperature Super-Conducting Rotor Coil Support With Tension Rods And Bolts And Assembly Method", filed May 15, 2001;

U.S. patent application Ser. No. 09/854,939 entitled "High Temperature Super-Conducting Coils Supported By An Iron Core Rotor", filed May 15, 2001;

U.S. patent application Ser. No. 09/854,938 entitled "High Temperature Super-Conducting Synchronous Rotor Having An Electromagnetic Shield And Method For Assembly", filed May 15, 2001;

U.S. patent application Ser. No. 09/854,940 entitled "High Temperature Super-Conducting Rotor Coil Support Arid Coil Support Method", filed May 15, 2001;

U.S. patent application Ser. No. 09/854,937 entitled "High Temperature Super-Conducting Rotor Having A Vacuum Vessel And Electromagnetic Shield And Method For Assembly", filed May 15, 2001;

U.S. patent application Ser. No. 09/854,943 entitled "Cryogenic Cooling System For Rotor Having A High Temperature Super-Conducting Field Winding", filed May 15, 2001;

U.S. patent application Ser. No. 09/854,464 entitled "High Temperature Super-Conducting Racetrack Coil", filed May 15, 2001; and U.S. patent application Ser. No. 09/855,034 entitled "High Temperature Super Conducting Rotor Power Leads", filed May 15, 2001.

BACKGROUND OF THE INVENTION

The present invention relates generally to applying a super-conducting coil to a high power density synchronous rotating machine. More particularly, the present invention relates to a synchronous machine with a conventional stator, and a magnetically saturated solid iron core rotor having a super-conducting coil.

Synchronous electrical machines having field coil windings include, but are not limited to, rotary generators, rotary motors, and linear motors. These machines generally comprise a stator and rotor that are electromagnetically coupled. The rotor may include a multi-pole rotor core and one or more coil windings mounted on the rotor core. The rotor cores may include a magnetically-permeable solid material, such as an iron-core rotor.

Conventional copper windings are commonly used in the rotors of synchronous electrical machines. However, the electrical resistance of copper windings (although low by conventional measures) is sufficient to contribute to substantial heating of the rotor and to diminish the power efficiency of the machine. Recently, super-conducting (SC) coil windings have been developed for rotors. SC windings have effectively no resistance and are highly advantageous rotor coil windings.

Iron-core rotors saturate at an air-gap magnetic field strength of about 2 Tesla. Known super-conducting rotors employ air-core designs, with no iron in the rotor, to achieve air-gap magnetic fields of 3 Tesla or higher. These high air-gap magnetic fields yield increased power densities of the electrical machine, and result in significant reduction in weight and size of the machine. Air-core super-conducting rotors require large amounts of super-conducting wire. The large amounts of SC wire add to the number of coils required, the complexity of the coil supports, and the cost of the SC coil windings and rotor.

While iron core super-conducting rotors have been largely ignored by industry, iron core rotors offer certain advantages over air-core rotors, when operated at magnetic field saturation to increase the air-gap magnetic field and power density of the machine. The advantage is that it takes considerably less super-conductor material in a magnetically saturated iron-core rotor to attain the same benefits of high machine power density as compared to an air-core rotor.

High temperature SC coil field windings are formed of super-conducting materials that are brittle, and must be cooled to a temperature at or below a critical temperature, e.g., 27° K, to achieve and maintain super-conductivity. The SC windings may be formed of a high temperature super-conducting material, such as a BSCCO ($Bi_xSr_xCa_xCu_xO_x$) based conductor.

Super-conducting coils have not been adapted for commercial use in the rotors of synchronous machines. Attempts have been made to incorporate SC coils into high power density generators and other such synchronous machines. The potential benefits of adding SC coils to high power density machines include light weight and compact machines. These high power density machines typically include an air-core rotor and an air-gap stator with no stator iron teeth. However, high power density machines tend to be expensive and have been commercially impractical.

SC coils, their coil supports and the associated refrigeration systems have been expensive and complex. SC coils are expensive materials, such as BSCCO. These materials are also brittle. The coil support systems needed for SC coils must withstand the tremendous forces encountered in the rotor of a large synchronous machine and protect the brittle coils. Moreover, these support systems must not transfer substantial heat into the cryogenically cooled coils.

Further the refrigeration systems that provide cryogenic cooling fluids, such as helium, are complex and expensive. Accordingly, the cost and complexity of incorporating SC coils into a synchronous machine have been high. For SC coils to become commercially viable, their associated costs should be reduced to well below the advantages gained by substituting SC coils for conventional copper coils in the rotor.

The cost of using SC coils has become more affordable with the development of high temperature super-conducting (HTS) materials. Because they maintain super-conducting conditions (including no resistance) at relative high temperatures, e.g. 27° K, the cost to cool a HTS coil is substantially reduced as compared to cooling costs for prior SC that had to be cooled to lower temperatures. There is still a need for lower cost SC coils and coil support systems.

Super-conducting coils have been cooled by liquid helium. After passing through the windings of the rotor, the hot, used helium is returned as room-temperature gaseous helium. Using liquid helium for cryogenic cooling requires continuous reliquefaction of the returned, room-temperature gaseous helium, and such reliquefaction poses significant reliability problems and requires significant auxiliary power.

Prior SC coil cooling techniques include cooling an epoxy-impregnated SC coil through a solid conduction path from a cryocooler. Alternatively, cooling tubes in the rotor may convey a liquid and/or gaseous cryogen to a porous SC coil winding that is immersed in the flow of the liquid and/or gaseous cryogen. However, immersion cooling requires the entire field winding and rotor structure to be at cryogenic temperature, as a result no iron can be used in the rotor magnetic circuit because of the brittle nature of iron at cryogenic temperatures.

What is needed is a HTS electrical machine that is substantially less expensive that prior HTS machines, and is competitively priced with existing conventional copper coil machines. To become commercially successful, HTS machines need to become cost competitive with conventional copper machines. Potential technical areas for reducing costs further include the coil support system, the rotor design and retrofitting existing machines with HTS rotors. Further, there is a need for an improved rotor field winding assemblage for an electrical machine that does not have the disadvantages of the air-core and liquid-cooled superconducting field winding assemblages of, for example, known super-conducting rotors.

Developing support systems for HTS coil has been a difficult challenge in adapting SC coils to HTS rotors. Examples of coil support systems for HTS rotors that have previously been proposed are disclosed in U.S. Pat. Nos. 5,548,168; 5,532,663; 5,672,921; 5,777,420; 6,169,353, and 6,066,906. However, these coil support systems suffer various problems, such as being expensive, complex and requiring an excessive number of components. There is a long-felt need for a HTS rotor having a coil support system for a SC coil. The need also exists for a coil support system made with low cost and easy to fabricate components.

BRIEF SUMMARY OF THE INVENTION

A high power density super-conducting machine with a rotor having a SC coil field winding has been developed that appears to be cost competitive with existing copper coil, low power density machines. Costs may be reduced by employing a magnetically saturated solid core rotor, a conventional stator and a minimal coil support structure. Using these technologies, an efficient HTS machine having the advantages of SC coil has been developed. Moreover, the cost to build such a HTS machine can be sufficiently reduced so that the machine is economical.

The HTS machine includes a conventional stator and a HTS rotor. The conventional stator is designed for high air-gap magnetic fields that are provided by the HTS rotor. The rotor includes a two-pole core body formed of a solid magnetic material, such as iron. The rotor core body is generally cylindrical and has flat surfaces machined longitudinally along its length. The HTS coil is assembled around these flat surfaces and the coil has a race-track shape that extends around the core. The rotor coil ampere-turns are sufficiently high to magnetically saturate the rotor core and operate the machine at high air-gap magnetic fields.

The race-track coil is supported by tension coil support members that extend through the iron core rotor body. Drive and collector shafts are mechanically fastened to the rotor core. A cylindrical shell electromagnetic shield surrounds the HTS coil and iron core rotor body.

The iron core rotor significantly reduces the field winding ampere-turns, super-conductor utilization and cost with respect to air-core rotors. The single race-track shaped HTS coil replaces typical complex saddle-shaped coil windings. The tension coil support provides direct support to the HTS coil so as to reduce the strains on the coil during cool-down and centrifugal loading. Moreover, the coil support system is at cryogenic temperatures with the coil.

The HTS rotor may be implemented in a machine originally designed to include a SC coil(s). The rotor and its SC coil are described in the context of a generator, but the HTS coil rotor and coil support disclosed here are also suitable for use in other synchronous machines.

In a first embodiment the invention is a high power density synchronous machine comprising: a stator having conventional stator coils arranged in an annulus around a vacuum cylindrical cavity; a cylindrical magnetically saturated solid rotor core; a race-track super-conducting coil winding extending around the rotor core, and a coil support extending through the core and attaching to opposite long sides of the coil winding.

In a second embodiment of the invention is a high power density synchronous machine having a rotate capacity of at least 100 MVA comprising: a conventional stator having stator coils arranged in an annulus forming a vacuum rotor cavity; a cylindrical magnetically saturated rotor core having a pair of planer sections on opposite sides of the core and extending longitudinally along the core, and a super-conducting coil winding extending around at least a portion of the rotor core, the coil winding having a pair of side sections adjacent the planer sections of the core.

BRIEF DESCRIPTION OF THE DRAWINGS

The accompanying drawings in conjunction with the text of this specification describe an embodiment of the invention.

DETAILED DESCRIPTION OF THE INVENTION

Figure 1:
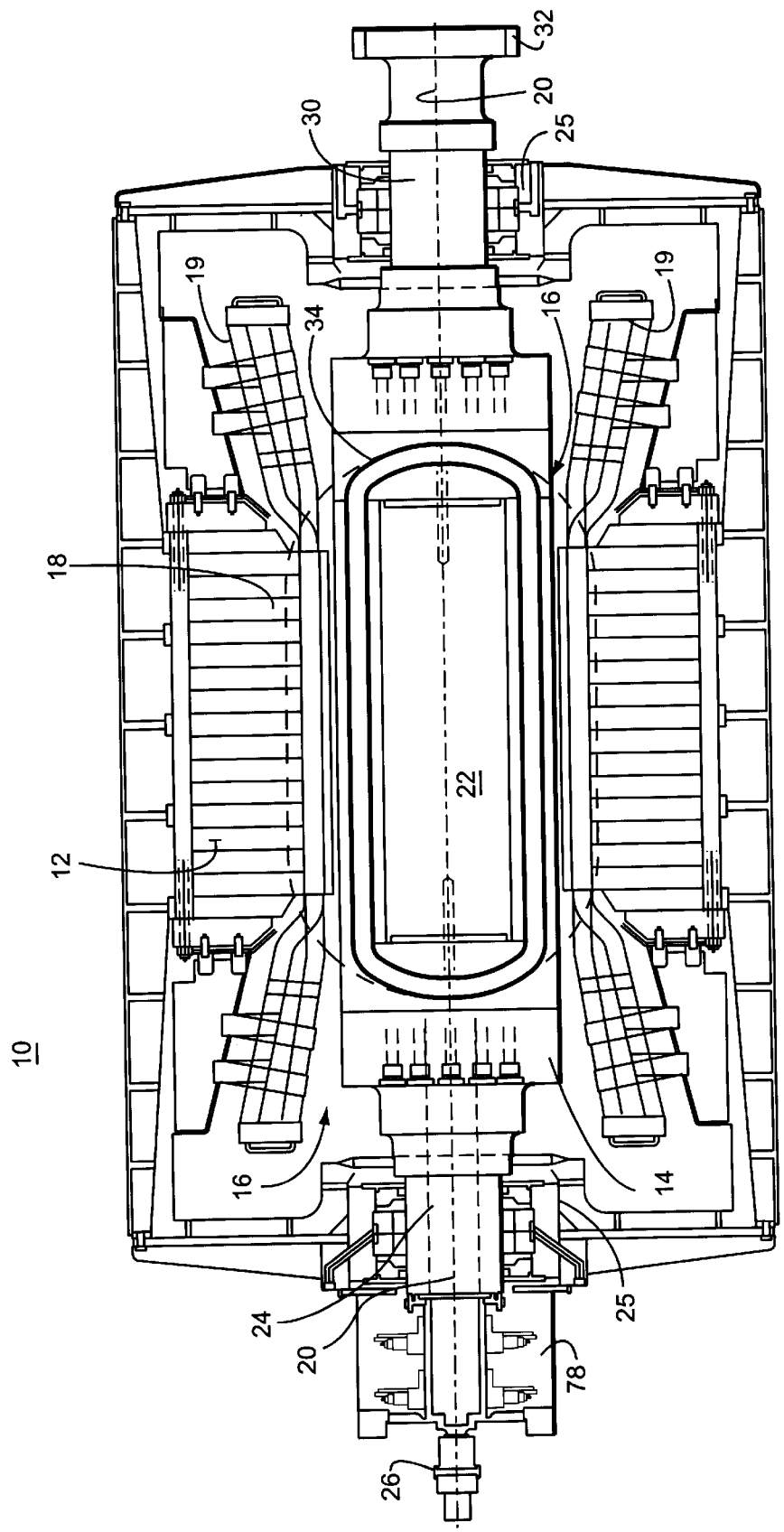
FIG. 1 is a schematic side elevational view of a synchronous electrical machine having a super-conducting rotor and a stator.

FIG. 1 shows an exemplary synchronous generator machine 10 having a stator 12 and a rotor 14. The rotor includes field winding coils that fit inside the cylindrical rotor vacuum cavity 16 of the stator. The stator includes conventional stator windings 19. These windings are arranged in an annulus around the rotor vacuum cavity. The windings are separated from each other by narrow air gaps filled with non-metallic teeth for structural support. Hence the stator is named an "air-gap" stator. Alternatively, the gaps between the stator windings may be filled with iron teeth to improve the concentration of magnetic flux in the stator coil windings. Air-gap stators and stators with iron teeth are well known in the art.

The rotor 14 fits inside the rotor vacuum cavity 16 of the stator. As the rotor turns within the stator, a magnetic field 18 (illustrated by dotted lines) generated by the rotor and rotor coils moves/rotates through the stator and creates an electrical current in the windings of the stator coils. This current is output by the generator as electrical power.

The rotor 14 has a generally longitudinally-extending axis 20 and a generally solid rotor core 22. The solid core 22 has high magnetic permeability, and is usually made of a ferromagnetic material, such as iron. In a high power density super-conducting machine, the iron core of the rotor is used in a magnetically saturated state to reduce the magnetomotive force (MMF), and, thus, minimize the amount of super-conducting (SC) coil wire needed for the coil winding. For example, the solid iron-rotor core may be magnetically saturated at magnetic field strength of about 2 Tesla or higher.

Figure 2:
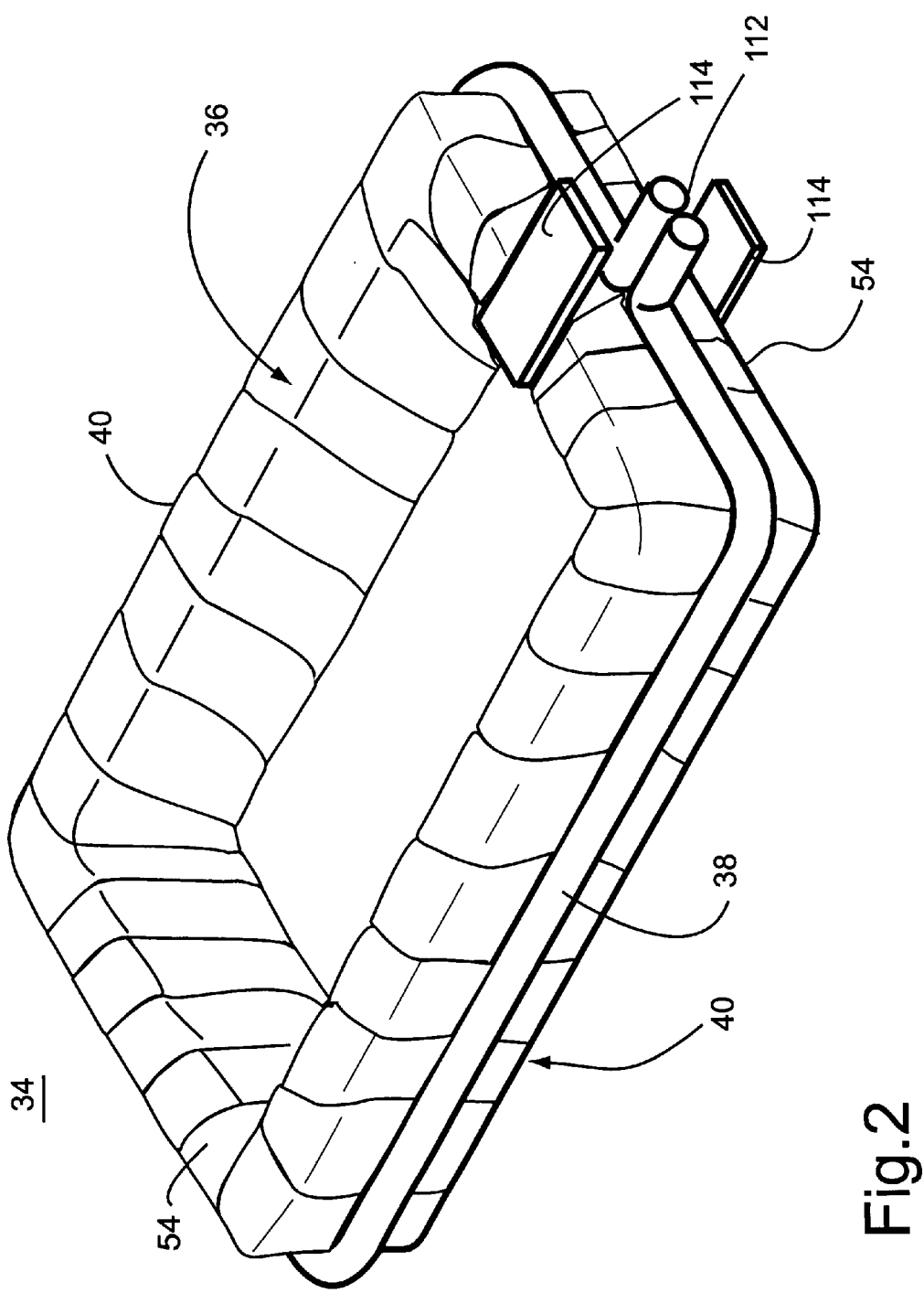
FIG. 2 is a perspective view of an exemplary race-track super-conducting coil winding.

The rotor 14 supports at least one longitudinally-extending, race-track shaped, high-temperature superconducting (HTS) coil winding 34 (See FIG. 2). A coil support system is disclosed here for a single race-track SC coil winding. The coil support system may be adapted for coil configurations other than a single race-track coil mounted on a solid rotor core, such as a multiple race-track coil configuration.

The rotor core is supported by end shafts attached to the core. The rotor includes a collector end shaft 24 and a drive end shaft 30 that are supported by bearings 25. The end shafts may be coupled to external devices. The collector end shaft 24 includes collector rings 78 that provide an external electrical connection to the SC coil. The collector end shaft also has a cryogen transfer coupling 26 to a source of cryogenic cooling fluid used to cool the SC coil windings in the rotor. The cryogen transfer coupling 26 includes a stationary segment coupled to a source of cryogen cooling fluid and a rotating segment which provides cooling fluid to the HTS coil. The drive end shaft 30 of the rotor may be driven by a power turbine via power coupling 32.

FIG. 2 shows an exemplary HTS race-track field coil winding 34. The SC field winding coils 34 of the rotor includes a high temperature super-conducting (SC) coil 36. Each SC coil includes a high temperature super-conducting conductor, such as a BSCCO ($Bi_xSr_xCa_xCu_xO_x$) conductor wires laminated in a solid epoxy impregnated winding composite. For example, a series of BSCCO 2223 wires may be laminated, bonded together and wound into a solid epoxy impregnated coil.

SC wire is brittle and easy to be damaged. The SC coil is typically layer wound SC tape that is epoxy impregnated. The SC tape is wrapped in a precision coil form to attain close dimensional tolerances. The tape is wound around in a helix to form the race-track SC coil 36.

The dimensions of the race-track coil are dependent on the dimensions of the rotor core. Generally, each race-track SC coil encircles the magnetic poles at opposite ends of the rotor core, and is parallel to the rotor axis. The coil windings are continuous around the race-track. The SC coils form a resistance free electrical current path around the rotor core and between the magnetic poles of the core. The coil has electrical contacts 114 that electrically connect the coil to the collector 78.

Fluid passages 38 for cryogenic cooling fluid are included in the coil winding 34. These passages may extend around an outside edge of the SC coil 36. The passageways provide cryogenic cooling fluid to the coil and remove heat from the coil. The cooling fluid maintains the low temperatures, e.g., 27° K, in the SC coil winding needed to promote superconducting conditions, including the absence of electrical resistance in the coil. The cooling passages have an input and output fluid ports 112 at one end of the rotor core. These fluid (gas) ports 112 connect the cooling passages 38 on the SC coil to the cryogen transfer coupling 26.

Each HTS race-track coil winding 34 has a pair of generally straight side portions 40 parallel to a rotor axis 20, and a pair of end portions 54 that are perpendicular to the rotor axis. The side portions of the coil are subjected to the greatest centrifugal stresses. Accordingly, the side portions are supported by a coil support system that counteract the centrifugal forces that act on the coil.

Figure 3:
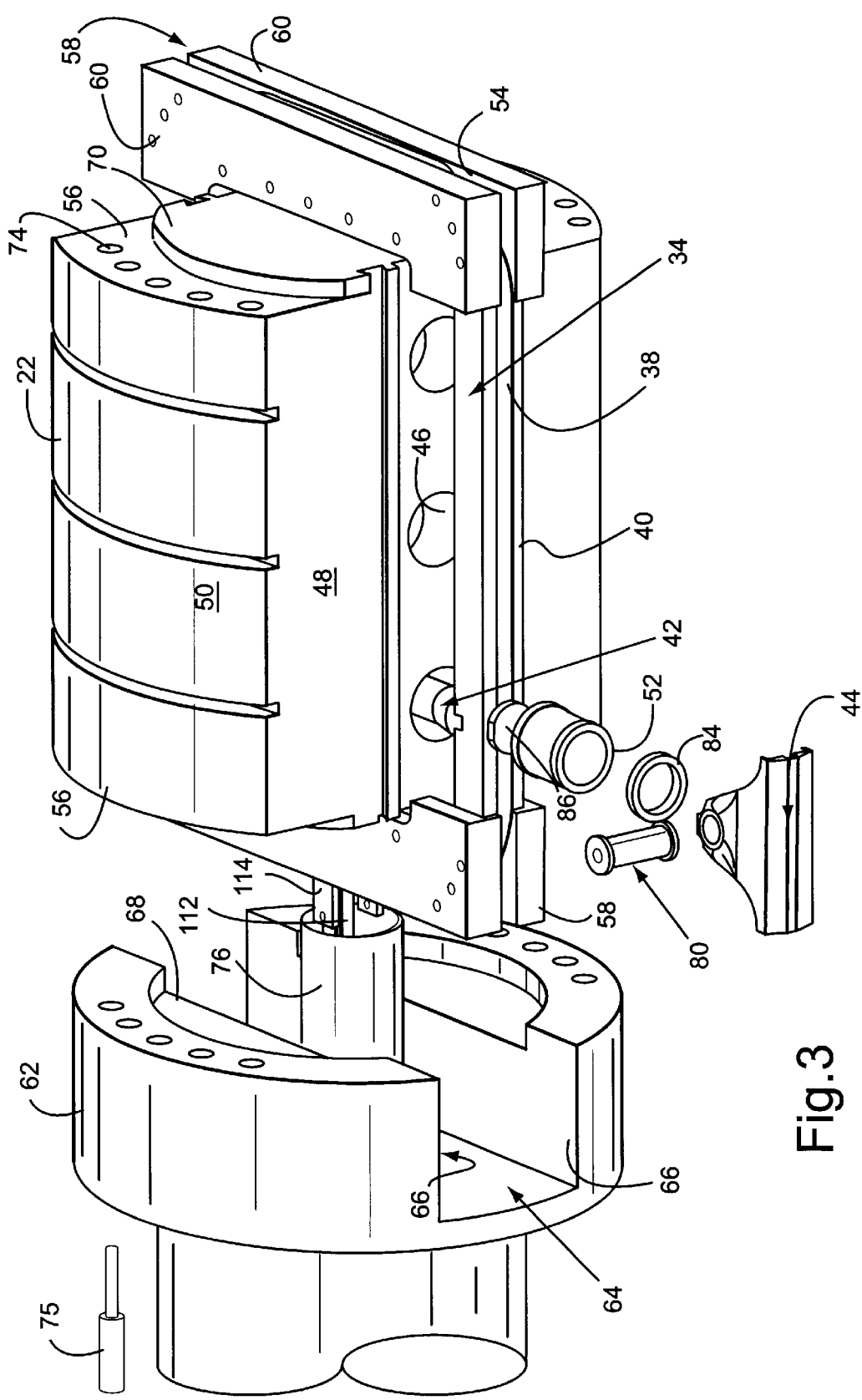
FIG. 3 is an exploded view of the components of a high temperature super-conducting (HTS) rotor.

FIG. 3 shows an exploded view of a rotor core 22 and coil support system for a high temperature super-conducting coil. The support system includes tension rods 42 connected to U-shaped coil housings at opposite ends of each rod. The coil housings hold and support the side portions 40 of the coil winding 34 in the rotor. While one tension rod and coil housing is shown in FIG. 3, the coil support system will generally include a series of tension rods with housings at the ends of each rod. The tension rods and coil housings prevent damage to the coil winding during rotor operation, support the coil winding with respect to centrifugal and other forces, and provide a protective shield for the coil winding.

The principal loading of the HTS coil winding 34 in an iron core rotor is from centrifugal acceleration during rotor rotation. An effective coil structural support is needed to counteract the centrifugal forces. The coil support is needed especially along the side sections 40 of the coil that experience the most centrifugal acceleration. To support the side sections of the coil, the tension rods 42 span between the sections of the coil and attach to the coil housings 44 that grasp opposite side sections of the coil. The tension rods extend through conduits 46, e.g., apertures, in the rotor core so that the rods may span between side sections of the same coil or between adjacent coils. FIG. 3 shows the rod 42 extending beyond the coil solely for illustrative purposes. In practice, the rod does not extend beyond the coil, but rather abuts a surface of the coil facing the core.

The conduits 46 are generally cylindrical passages in the rotor core having a straight axis. The diameter of the conduits is substantially constant, except at their ends near the recessed surfaces of the rotor. At their ends, the conduits may expand to a larger diameter to accommodate a non-conducting cylindrical insulator tube 52 that provides a slidable bearing surface and thermal isolation between the rotor core and the tension rod. A lock-nut 84 holds the tube in the conduit 46.

The axes of the conduits 46 are generally in a plane defined by the race-track coil. In addition, the axes of the conduits are perpendicular to the side sections of the coil to which are connected the tension rods that extends through the conduits. Moreover, the conduits are orthogonal to and intersect the rotor axis, in the embodiment shown here. The number of conduits and the location of the conduits will depend on the location of the HTS coils and the number of coil housings needed to support the side sections of the coils.

The tension rods support the coil especially well with respect to centrifugal forces as the rods extend substantially radially between the sides of the coil winding. Each tension rod is a shaft with continuity along the longitudinal direction of the rod and in the plane of the race-track coil. The longitudinal continuity of the tension rods provides lateral stiffness to the coils which provides rotor dynamics benefits. Moreover, the lateral stiffness permits integrating the coil support with the coils so that the coil can be assembled with the coil support prior to final rotor assembly. Pre-assembly of the coil and coil support reduces production cycle, improves coil support quality, and reduces coil assembly variations. The race-track coil is supported by an array of tension members that span the long sides of the coil. The tension rod coil support members are pre-assembled to coil.

The HTS coil winding and structural support components are at cryogenic temperature. In contrast, the rotor core is at ambient "hot" temperature. The coil supports are potential sources of thermal conduction that would allow heat to reach the HTS coils from the rotor core. The rotor becomes hot during operation. As the coils are to be held in super-cooled conditions, heat conduction into the coils is to be avoided. The rods extend through apertures, e.g., conduits, in the rotor but are not in contact with the rotor. This lack of contact avoids the conduction of heat from the rotor to the tension rods and coils.

To reduce the heat leaking away from the coil, the coil support is minimized to reduce the thermal conduction through support from heat sources such as the rotor core. There are generally two categories of support for superconducting winding: (i) "warm" supports and (ii) "cold" supports. In a warm support, the supporting structures are thermally isolated from the cooled SC windings. With warm supports, most of the mechanical load of a super-conducting (SC) coil is supported by structural members spanning from cold to warm members.

In a cold support system, the support system is at or near the cold cryogenic temperature of the SC coils. In cold supports, most of the mechanical load of a SC coil is supported by structural members which are at or near a cryogenic temperature. The exemplary coil support system disclosed here is a cold support in that the tension rods and associated housings that couple the tension rods to the SC coil windings are maintained at or near a cryogenic temperature. Because the supporting members are cold, these members are thermally isolated, e.g., by the non-contact conduits through the rotor core, from other "hot" components of the rotor.

An individual support member consists of a tension rod 42 (which may be a bar and a pair of bolts at either end of the bar), a pair of coil housings 44, and a dowel pin 80 that connects each housing to an end of the tension rod. Each coil housing 44 is a U-shaped bracket having legs that connect to a tension rod and a channel to receive the coil winding 34. The U-shaped housing allows for the precise and convenient assembly of the support system for the coil. A series of coil housings may be positioned end-to-end along the side of the coil winding. The coil housings collectively distribute the forces that act on the coil, e.g., centrifugal forces, over substantially the entire side sections 40 of each coil.

The coil housings 44 prevent the side sections 40 of the coils from excessive flexing and bending due to centrifugal forces. The coil supports do not restrict the coils from longitudinal thermal expansion and contraction that occur during normal start/stop operation of the gas turbine. In particular, thermal expansion is primarily directed along the length of the side sections. Thus, the side sections of the coil slide slightly longitudinally with respect to the channel housing and tension rods.

The U-shaped housings are formed of a light, high strength material that is ductile at cryogenic temperatures. Typical materials for coil housings are aluminum, Inconel, or titanium alloys, which are non-magnetic. The shape of the U-shaped housing may be optimized for low weight and strength.

The dowel pin 80 extends through apertures in the coil housing and tension rod. The dowel may be hollow for low weight. Locking nuts (not shown) are threaded or attached at the ends of the dowel pin to secure the housing and prevent the sides of the housing from spreading apart under load. The dowel pin can be made of high strength Inconel or titanium alloys. The tension rods are made with larger diameter ends that are machined with two flat surfaces 86 at their ends.

The width of these flat surfaces fit the U-shaped housing and coil width. The flat ends 86 of the tension rods abut an inside surface of the HTS coils 34, when the rod, coil and housing are assembled together. This assembly reduces the stress concentration at the hole in the tension rod that receives the dowel.

The coil support system of tension rods 42 and coil housings 44 for the long sides 40 of the coil, and a pair of split-clamps 58 for the coil ends may be assembled with the HTS coil windings 34 as both are mounted on the rotor core 22. The tension rods, channel housings and clamp provide a fairly rigid structure for supporting the coil windings and holding the coil windings in place with respect to the rotor core.

Each tension rod 42 extends through the rotor core, and may extend orthogonally through the axis 20 of the rotor. Conduits 46 through the rotor core provide a passage through which extend the tension rods. The conduits 46 extend perpendicularly through the rotor axis and are symmetrically arranged along the length of the core. The number of conduits 46 and tension rods 42, and their arrangement on the rotor core and with respect to each other is a matter of design choice. The diameter of the conduits is sufficiently large to avoid having the hot rotor walls of the conduits be in contact with the cold tension rods. The avoidance of contact improves the thermal isolation between the tension rods and the rotor core.

To receive the coil winding, the rotor core has recessed surfaces 48, such as flat or triangular regions or slots. These surfaces 48 are formed in the curved surface 50 of the cylindrical core and extending longitudinally across the rotor core. The coil winding 34 is mounted on the rotor adjacent the recessed areas 48. The coils generally extend longitudinally along an outer surface of the recessed area and around the ends of the rotor core. The recessed surfaces 48 of the rotor core receive the coil winding. The shape of the recessed area conforms to the coil winding. For example, if the coil winding has a saddle-shape or some other shape, the recess(es) in the rotor core would be configured to receive the shape of the winding.

The recessed surfaces 48 receive the coil winding such that the outer-surface of the coil winding extend to substantially an envelope defined by the rotation of the rotor. The outer curved surfaces 50 of the rotor core when rotated define a cylindrical envelope. This rotation envelope of the rotor has substantially the same diameter as the rotor cavity 16 (see FIG. 1) in the stator.

The gap between the rotor envelope and stator cavity 16 is a relatively-small clearance, as required for forced flow ventilation cooling of the stator only, since the rotor requires no ventilation cooling. The magnetic field in the gap between the rotor and the stator couples electromagnetically the rotor coil windings with the stator windings and directly impacts the power density of the machine.

The power density of the machine 10 can be increased by driving the iron core rotor to magnetic saturation with higher rotor coil magnetomotive force (MMF). For example, a HTS rotor of just 65 inches in length has been designed for a 100 MVA rated generator using rotor coil MMF of 314,000 ampere-turns, whereas the same power level generator required a conventional copper rotor having a length of 128 inches and coil MMF of 204,000 ampere-turns. Moreover, the 50% reduction in the length of the machine results in 35% reduction in machine size.

The end sections 54 of the coil winding 34 are adjacent opposite ends 56 of the rotor core. A split-clamp 58 holds each of the end sections of the coil windings in the rotor. The split clamp at each coil end 54 includes a pair of opposite plates 60 between which is sandwiched the coil winding 34. The surface of the clamp plates includes channels to receive the coil winding and connections 112, 114 to the winding.

The split clamp 58 may be formed of a non-magnetic material, such as aluminum or Inconel alloys. The same or similar non-magnetic materials may be used to form the tension rods, channel housings and other portions of the coil support system. The coil support system is preferably non-magnetic so as to preserve ductility at cryogenic temperatures, since ferromagnetic materials become brittle at temperatures below the Curie transition temperature and cannot be used as load carrying structures.

The split clamp 58 is surrounded by, but is not in contact with collar 62. The end shafts 24, 30 include a collar 62 that connects to an end of the rotor core 22. The collar is a thick disk of non-magnetic material, such as stainless steel, the same as or similar to the material that forms the rotor end shafts. The collar has a slot 64 orthogonal to the rotor axis and sufficiently wide to receive and clear the split clamp 58. The hot side-walls 66 of the slot collar are spaced apart from the cold split clamp so they do not come in contact with each other.

The collar 62 may include a recessed disk area 68 (which is bisected by the slot 64) to receive a raised disk region 70 of the rotor core (see opposite side of rotor core for raised disk region to be inserted in opposite collar). The insertion of the raised disk region on the end 56 of the rotor core into the recessed disk 68 provides support to the rotor core in the collar, and assists in aligning the rotor core and collars. In addition, the collar may have a circular array of bolt holes 72 extending longitudinally through the collar and around the rim of the collar. These bolt holes correspond to matching threaded bolt holes 74 that extend partially through the rotor core. Threaded bolts 75 extend through these longitudinal bolt holes 72, 74 and secure the collars to the rotor core.

The rotor core may be encased in a metallic cylindrical shield (not shown) that protects the super-conducting coil winding 34 from eddy currents and other electrical currents that surround the rotor and provides the vacuum envelope as required to maintain hard vacuum around the cryogenic components of the rotor. The cylindrical shield may be formed of a highly conductive material, such as a copper alloy or aluminum. The SC coil winding 34 is maintained in a vacuum. The vacuum may be formed by the shield which may include a stainless steel cylindrical layer that forms a vacuum vessel around the coil and rotor core.

While the invention has been described in connection with what is presently considered to be the most practical and preferred embodiment, it is to be understood that the invention is not to be limited to the disclosed embodiment, but on the contrary, is intended to cover all embodiments within the spirit of the appended claims.

What is claimed is:

1. A synchronous machine comprising:
   a stator having stator coils arranged in an annulus around a vacuum cylindrical cavity;
   a cylindrical magnetic solid rotor core having a core axis;
   a super-conducting coil winding mounted on the rotor core and having opposite long side sections parallel to the core axis, wherein the coil winding is thermally isolated from the core, and
   a coil support extending through the core and attaching to the opposite long sides of the coil winding.

2. A synchronous machine as in claim 1 wherein the stator is a conventional stator, and said solid rotor core is magnetically saturated.

3. A synchronous machine as in claim 1 wherein the stator is an air-gap stator, and said solid rotor core is magnetically saturated.

4. A synchronous machine as in claim 1 further comprising rotor end shafts axially attached to said rotor core.

5. A synchronous machine as in claim 4 wherein the end shafts are a non-magnetic metal.

6. A rotor as in claim 5 wherein the end shafts are stainless steel.

7. A rotor as in claim 1 wherein one of said end shafts is a collector end shaft having collector rings and a cryogenic fluid coupling.

8. A synchronous machine as in claim 1 wherein the rotor core is a solid magnetic iron forging and is maintained at or above an ambient temperature.

9. A synchronous machine as in claim 1 wherein the air gap between the stator coil and the rotor is minimally sufficient for air cooling of the stator.

10. A synchronous machine having a rotate capacity of at least 100 MVA comprising:
    a stator having stator coils arranged in an annulus forming a vacuum rotor cavity;
    a cylindrical solid rotor core having a pair of planer sections on opposite sides of the core and extending longitudinally along the core, wherein said core is thermally isolated from the coil winding, and
    the super-conducting coil winding extending around at least a portion of the rotor core, said coil winding having a pair of side sections adjacent said planer sections of the core.

11. A synchronous machine as in claim 10 further comprising:
    a first end shaft extending axially from a first end of the rotor core, and
    a second end shaft extending axially from a second end of the rotor core.

12. A synchronous machine as in claim 11 wherein the end shafts are a non-magnetic metal.

13. A synchronous machine as in claim 11 wherein the end shafts are stainless steel.

14. A synchronous machine as in claim 10 wherein the rotor core is a solid magnetic iron forging.

15. A synchronous machine as in claim 10 wherein the coil has a race-track shape.

16. A synchronous machine as in claim 11 wherein one of said end shafts is a collector end shaft having collector rings and a cryogenic fluid coupling.

17. A synchronous machine as in claim 10 wherein the rotor core is magnetically saturated and at a temperature at least as hot as an ambient temperature.

18. A synchronous machine as in claim 10 wherein the coil has a coil support attached to each of said pair of side sections and said coil support extending through the core from one of said pair of planer sections to the other of said pair of planer sections.

19. A synchronous machine as in claim 10 further comprising a conductive shield around the rotor core and coil.

* * * * *

UNITED STATES PATENT AND TRADEMARK OFFICE
CERTIFICATE OF CORRECTION

PATENT NO.    : 6,590,308 B2                                                        Page 1 of 1
DATED         : July 8, 2003
INVENTOR(S)   : Dawson et al.

It is certified that error appears in the above-identified patent and that said Letters Patent is hereby corrected as shown below:

<u>Column 1,</u>
Line 38, kindly delete "Arid" and insert -- And -- therefor.

Signed and Sealed this

Twenty-third Day of September, 2003

JAMES E. ROGAN
*Director of the United States Patent and Trademark Office*